United States Patent
Holland

[19]

[11] Patent Number: 5,645,378
[45] Date of Patent: *Jul. 8, 1997

[54] LIQUID HYDROCARBON SORBING AND SOLIDIFYING PILLOW

[76] Inventor: Herbert W. Holland, 2314 Chimney Rock, Houston, Tex. 77056

[*] Notice: The term of this patent shall not extend beyond the expiration date of Pat. No. 5,462,785.

[21] Appl. No.: 740,473

[22] Filed: Oct. 30, 1996

Related U.S. Application Data

[63] Continuation of Ser. No. 506,091, Jul. 24, 1995, Pat. No. 5,588,785, which is a continuation-in-part of Ser. No. 222,844, Apr. 5, 1994, Pat. No. 5,462,785.

[51] Int. Cl.$^6$ .................... E02D 31/00; B32B 3/00
[52] U.S. Cl. .................. 405/270; 210/424; 428/72; 428/76; 588/249; 588/255
[58] Field of Search .................... 588/249, 252, 588/255, 259, 260; 210/242.4, 484, 693, 924; 405/129, 267, 270; 428/68, 71, 72, 76, 102, 195

[56] References Cited

U.S. PATENT DOCUMENTS

| | | | |
|---|---|---|---|
| 3,563,837 | 2/1971 | Smith et al. | 428/71 |
| 3,904,528 | 9/1975 | Yocum | 210/924 X |
| 3,940,940 | 3/1976 | Barrett | 405/270 |
| 4,360,021 | 11/1982 | Stima | 428/72 X |
| 4,406,403 | 9/1983 | Luebke | 405/270 X |
| 4,497,712 | 2/1985 | Cowling | 210/924 X |
| 4,797,310 | 1/1989 | Barby et al. | 428/71 |
| 4,826,030 | 5/1989 | Valley | 428/71 X |
| 4,862,539 | 9/1989 | Bokich | 428/71 X |
| 5,135,792 | 8/1992 | Hogan | 428/76 X |
| 5,139,151 | 8/1992 | Chelak | 428/71 X |
| 5,186,831 | 2/1993 | De Petris | 210/242.4 |
| 5,227,072 | 7/1993 | Brinkley | 210/693 X |
| 5,308,665 | 5/1994 | Sadek et al. | 428/76 X |
| 5,324,429 | 6/1994 | Holland | 210/484 |
| 5,356,678 | 10/1994 | Heitzhaus et al. | 428/76 X |
| 5,360,653 | 11/1994 | Ackley | 428/71 |
| 5,401,118 | 3/1995 | Kramer | 405/129 |
| 5,462,785 | 10/1995 | Holland | 428/76 |
| 5,588,785 | 12/1996 | Holland | 405/270 |

FOREIGN PATENT DOCUMENTS 15362  10/1991  WIPO ........................ 428/72

*Primary Examiner*—George A. Suchfield

[57] ABSTRACT

A device for collection and containment of spilled or leaked liquid hydrocarbons absorbs pollutants that come in contact. The absorbed material is solidified within the pillow into a rubber-like mass. An impermeable layer of material may be utilized in forming the bottom layer of the outer envelope of the device to retain accumulated hydrocarbons within the pillow while further allowing the contaminants to disperse throughout the device for absorption and solidification. The impermeable layer prevents spilled or leaked hydrocarbons from contaminating the surface below the device. The consolidated mass is easily retrieved and handled for disposal. A variety of options may be utilized in disposing of the spent device, including recycling the rubber-like mass as a component of tar-like materials, such as asphalt. The solidified hydrocarbons will not leech when exposed to pressure limits used to determine landfill suitability.

13 Claims, 4 Drawing Sheets

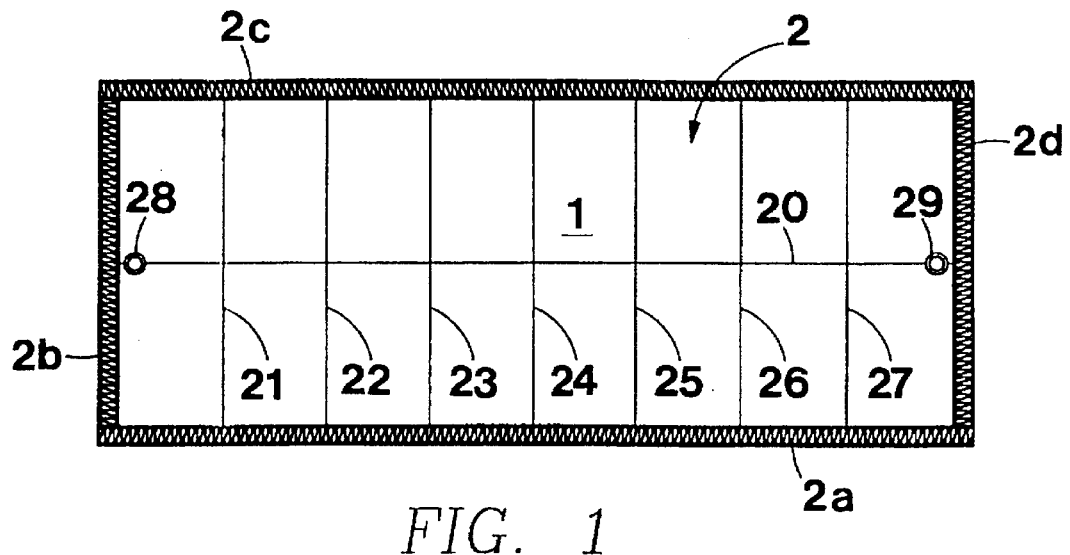
FIG. 1
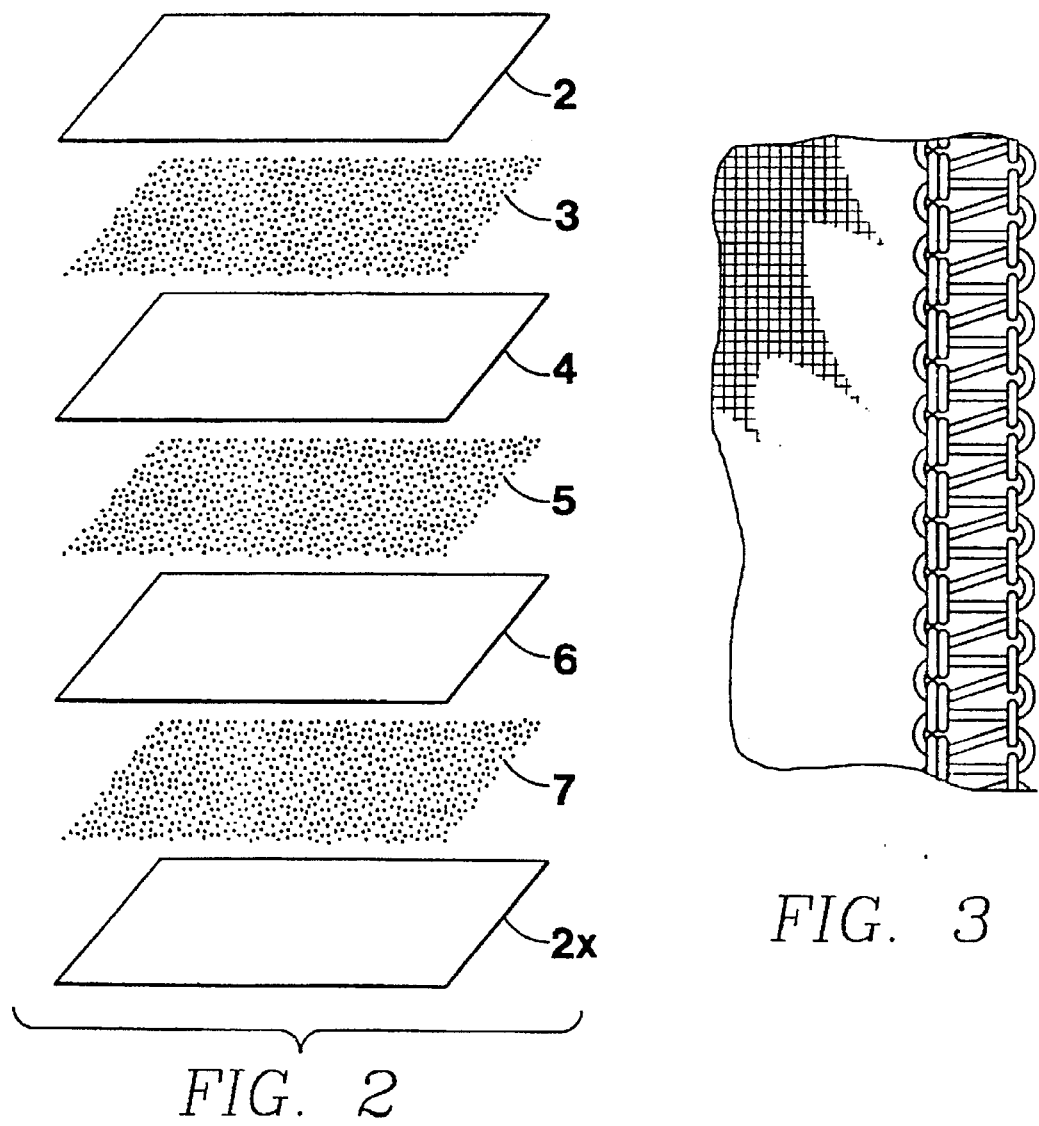
FIG. 2
FIG. 3

LIQUID HYDROCARBON SORBING AND SOLIDIFYING PILLOW

This application is a continuation of application Ser. No. 08/506,091 filed Jul. 24, 1995, now U.S. Pat. No. 5,588,785 which is a continuation-in-part of application Ser. No. 08/222,844 filed Apr. 5, 1994, now U.S. Pat. No. 5,462,785.

BACKGROUND OF THE INVENTION

The present invention relates to absorbent devices for use in containing and disposing of spilled or leaked hydrocarbons. The device further provides a variety of environmentally sound disposal options for spilled and leaked liquid hydrocarbons.

In a broad range of applications, there is a need to contain and remove liquid hydrocarbons that are spilled or leaked into the environment as part of the routine maintenance and operation of a wide variety of equipment and machinery utilizing liquid hydrocarbon products for fuel and lubrication. This critically important task is necessary to prevent pollution of the environment, by for example, entry of pollutants into an adjacent water column as the spilled or leaked liquid hydrocarbons seep through the ground, or allowing the hydrocarbons to flow downstream as waste water runoff.

One common approach to the task of removing spilled or leaked liquid hydrocarbons is to utilize absorbent devices to contain such spills. A wide variety of components, including cotton, peat moss, rice hulls and ground-up corn cobs are used in the fabrication of these devices. One such device relies on ground-up chicken feathers encased in a cotton pillow case. The largest class of sorbent devices are typically composed of a group of non-woven, petro-chemical based fabric materials having the physical properties of sorbing liquid hydrocarbons while repelling water. These devices are packaged as flat pads or sheets, or are rolled into cylindrical booms for placement to absorb and retain leaks and spills caused by the equipment. They are also packaged as strips of the non-woven fabric encased in an open weave plastic net, resulting in a sausage-like boom.

In each instance, these devices are placed in sump or containment areas where spilled or leaked hydrocarbons accumulate to absorb and collect them for extraction from the area.

Prior art absorbent devices of this type are subject to allowing liquid hydrocarbons to pass through the device and on to the surface where they are placed. The contaminants are then free to soak into the ground and pollute the adjacent area or stain the surface, such as a concrete pad, with a film of liquid hydrocarbons. Further, the absorbed liquid hydrocarbons are subject to release by gravity, column weight or outside forces exerting pressure on the devices as they are removed from the containment area. Disposal of these devices results in the displacement of a substantial volume of the absorbed liquid hydrocarbon pollutants from one environment to another.

SUMMARY OF THE INVENTION

In accordance with the present invention, an absorbent device is provided which not only absorbs liquid hydrocarbons, but also solidifies liquid hydrocarbons into an easily retrievable solid rubber-like mass. Further, the present invention may utilize an impermeable layer of material to form one layer of the outer envelope of the device, allowing the pillow-shaped device to retain accumulated hydrocarbons within the pillow. Sorbed contaminants coming into contact with the interior side of the impermeable layer allows the device to disperse liquid hydrocarbons throughout the pillow for further absorption and solidification. The impermeable layer prevents spilled or leaked hydrocarbons from passing through the device and contaminating the surface below the device.

The device is formed as a pillow from a textile material sewn to form layered chambers in stratification contained within an outer envelope which defines the overall pillow shape. A seam joinder extending along the contiguous sides of the device consolidates the internally stratified layers with the outer envelope layers along their peripheries.

One or more seams may be placed on or parallel to the longitudinal center axis of the pillow to create columns of stratified pockets. Cross-seams may be placed from one side of the pillow to the opposite side of the pillow, crossing the center axis of the pillow in a perpendicular alignment. Similarly, seams may be placed across the pillow in an oblique orientation to the longitudinal center axis of the pillow. The addition of such seams results in a quilting effect and serves to produce a calculated number and arrangement of chambers containing an approximately equal amount of solidifying polymer. The design and spacing of the seams creates multiple consolidation points of the stratified layers, the consolidation points acting as flow channels and defining multiple compartmented absorption cells to facilitate and hasten the migration of the spilled or leaked hydrocarbon contaminants to the solidifying polymer, followed by the absorption and solidification of the spill or leak.

The seaming of the textile material components, and the impermeable outer envelope layer of the device, if included, may be accomplished by several methods including mechanical stitching, thermal sealing and ultra-sonic fusing. These seaming methods may be used to seal the perimeter of the pillow, produce the individual chambers of solidifying polymer and unite the stratified internal layers with the outer envelope. The joining of the layers of textile material results in a series of consolidation points of the layers of textile material and creates the flow channels throughout the body of the pillow for migration of spills and leaks to the absorptive cells within the pillow.

The solidifying polymer may be placed in the pillow using several different methods. As a first example, approximately equally measured amounts of the polymer may be placed into the open end of the pillow after the bottom and sides of the internally stratified layers of textile material and the outer envelope layers of the device have been seamed together along their periphery by a seam joinder, creating a stratified arrangement of pockets. The inserted polymer collects at the bottom of the pockets and is sealed into the body of the device by the seam joinder of the stratified layers, creating a plurality of polymer-filled chambers in stratification within the outer envelope of the device.

One or more seams may be placed on or parallel to the longitudinal center axis of the pillow as it is being formed to create an arrangement of side-by-side elongated pockets. During the filling of the stratified arrangement of pockets, a seam may be placed across the center axis of the device, forming a plurality of stratified polymer-filled chambers. The step of introducing polymer into the open end of the pillow then sealing it into the chambers by placing a cross-seam may be repeated until all the stratified chambers have been formed to create a matrix arrangement of polymer-filled chambers stratified within the outer envelope of the pillow. Cross-seaming the device to form a matrix of chambers acts to provide a quilting effect that may be desired in order to increase the rate of migration of the hydrocarbons to the interior of the pillow by the creation of consolidation points and flow channels within the body of the device.

Cross-seaming the device may also be accomplished by placing seams in an oblique orientation to the center axis of the device. The placement of an arrangement of seams in an oblique orientation forms a comparable matrix of chambers within the device to provide a similar quilting effect that may be desired in order to increase the rate of migration of the hydrocarbons to the interior of the pillow by the creation of consolidation points and flow channels within the body of the device.

Other methods of stratifying and sealing the solidifying polymer within the outer envelope of the device may be used. One method calls for the solidifying polymer to be encased and sealed within individual bags of single layer textile material. Each bag is filled with a measured amount of the solidifying polymer and sealed to form a solitary chamber of solidifying polymer within a single layer of textile material. Individual bags may then be arranged side-by-side in a matrix configuration of rows and columns to produce a single layer of bags conforming to the designated perimeter dimensions of the finished pillow. Identical layers of the arrangement of polymer-filled bags may be duplicated and then stratified over the first layer of bags to produce the required thickness of the pillow. Each layer of the arrangement of bags may be positioned so the perimeter of the overall shape of the layer and the side-by-side intersections of the matrix of bags in each layer are aligned in substantial registration with the corresponding perimeter of the arrangement of bags and the side-by-side intersections of the arranged bags of the other layers.

The stratified layers of individual polymer-filled bags may then be enclosed within an outer envelope and sealed within the perimeter of the outer envelope by a seam joinder. The intersections of the individual polymer-filled bags of the stratified layers may be seamed to the outer envelope of the pillow, creating flow channels and consolidating points of the stratified layers and producing a quilting effect in the formation of the device. The solidifying polymer may also be suspended within the fibers of a textile material as they are being formed, or may be attached to the textile material. The suspending of the polymer may be accomplished by incorporating the polymer into the body of the fabric during the process used to form the textile material. This process is normally used in the production of melt-blown or spun-bonded textiles. The manufacturing of a synthetic textile fabric material starts with raw petro-chemical based pellets, such as polypropylene, being blended with pigments and/or additives. This mixture is heated to the melting point of the pellets and extruded into filaments. The filaments are drawn and attenuated, using high velocity air to align the polymer molecules and maximize fiber strength. The resulting continuous, high tenacity filaments are formed into a web on a moving conveyor screen and thermally fused together with a bonding system to maximize the strength and surface stability of the fabric. The polymer may be suspended within the fabric by adding it to the mix of raw petro-chemical based pellets, pigments and additives, melting the mixture and extruding filaments from the mixture. This method incorporates the polymer into the body of the filaments as they are formed.

The polymer may also be suspended within the fabric by injecting an evenly distributed amount of the polymer at an intermediate point as the web of filaments are formed on the conveyor screen. As the filaments are thermally fused together with the bonding system, the polymer is trapped within the fused filaments, becoming a component of the finished textile fabric material.

The polymer may be suspended within pockets in the fabric by fusing layers of textile material with a calendaring device having the capability of producing a pattern in the fused layers of textile material as it exits the bonding mechanism. An approximately evenly distributed amount of the polymer may be placed in a pattern, corresponding to the pattern of the calendaring device, on a layer of textile material filaments as it moves along a conveyor screen. A second layer comprising a web of textile material filaments may then be placed over the first web of filaments having the pattern of evenly distributed amounts of polymer positioned on it prior to introducing the layers of the material to the calendaring device. As the filaments of the two layers of material are thermally fused together by the bonding system, the polymer is trapped within pockets created by the calendaring device used to fuse the filaments, allowing the polymer to become a component of the finished textile fabric material.

An evenly distributed, measured amount of the polymer may also be attached to textile material by using an adhesive to bond the polymer to a layer of material. The layers of textile material holding the polymer within its web of filaments or bonded to the polymer may then be stratified between two layers of material forming the outer envelope of the device and sealed within the perimeter of the outer envelope of the pillow with a seam joinder. Longitudinal, lateral or oblique seams may be added to the device, if desired, to produce a quilting effect.

In each instance, the solidifying polymer is stratified and arranged between layers of textile material within a device formed by the outer envelope, with additional seams providing a quilting effect for the entire device, if desired.

Quilting of the pillow creates a series of continuous consolidation points of the internally stratified layers of textile material within the pillow envelope. The textile material absorbs the spilled or leaked liquid hydrocarbons on contact. This action, coupled with the continuous consolidation points of the layers of textile material and the unique stratification design of the chambered pillow, speeds migration of the liquid hydrocarbons throughout the interior of the pillow through the flow channels created by the seam joinder and the quilting seams via the capillary attraction of the liquid hydrocarbons to the textile material. The result is a uniform distribution of the liquid hydrocarbons throughout the entire structure of the pillow for absorption and solidification by the solidifying polymer within the stratified layers of the pillow.

Typically, the density and weight of the internal layers of stratified textile material may be substantially less than the density and weight of the textile material used to form the outer envelope of the pillow. This reduces the volume of liquid hydrocarbons that may be retained within the textile material segments of the pillow in the event the volume of the spill or leak exceeds of the capacity of the solidifying polymer within the pillow. Pillows fabricated utilizing thinner textile materials of less dense construction typically retain smaller volumes of liquid hydrocarbons within the textile material components of the pillow than devices fabricated using materials of greater density.

Chemical composition, thickness and density of the fibers utilized in the composition of a textile material play a critically governing role in controlling the rate of absorption and the ratio of retention of the liquid hydrocarbons being sorbed by the material. Textile materials formed by using a greater density of thicker fibers are sturdier and more resistant to tearing than textile materials composed of thinner fibers or formed in a less dense configuration. Thus, a heavier material may be used to form the outer envelope to add to the structural integrity and durability of the envelope while lighter textile material may be used to form the internally stratified chambers of solidifying polymer. The migration of the sorbed liquid hydrocarbons throughout the interior of the pillow via the capillary attraction of the liquid hydrocarbons to the textile material remains a characteristic while the level of retention of the liquid hydrocarbons diminishes.

The utilization of an impermeable layer of material, such as polyethylene, to form the bottom layer of the outer envelope serves to prevent sorbed liquid hydrocarbons from passing through the body of the device and on to the surface where the device has been placed in instances where the solidifying polymer may not have the required amount of time to solidify the spilled or leaked contaminants. The impermeable outer envelope layer may further enhance the effectiveness of the device as it serves to spreads the liquid contaminants throughout the body of the device for absorption and solidification.

BRIEF DESCRIPTION OF THE DRAWINGS

The accompanying drawings illustrate the preferred embodiments of the invention in which:

FIG. 1 is a top view of a first embodiment of a device in accordance with the present invention showing its pillow-shaped envelope form, the seams creating consolidation points of the outer envelope with the internally stratified layers of textile material along the longitudinal and lateral axes of the device, and the seams sewn on four sides;

FIG. 2 is an exploded illustration of the first embodiment of the device in FIG. 1, showing alternating layers of textile material and solidifying polymer arranged to conform to the desired dimensions of the pillow and stratified to the desired thickness of the pillow within an outer envelope;

FIG. 3 shows the detail of a seam that may be used to consolidate the internally stratified layers of textile material with the outer envelope of the pillow and to seal the stratified layers of polymer within the perimeter of the device in FIG. 1;

DESCRIPTION OF THE PREFERRED EMBODIMENTS

Figure 4:
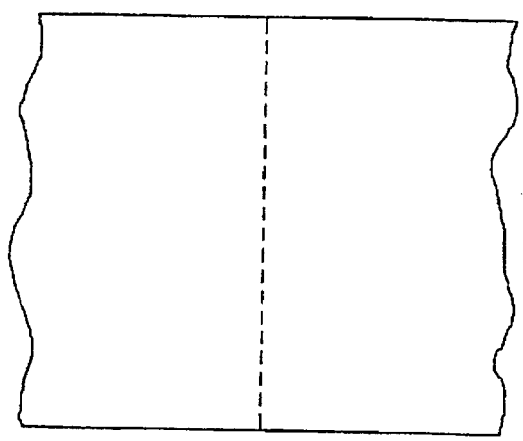
FIG. 4 shows the detail of a seam that may be used along the longitudinal axis and the cross-seams of the pillow to consolidate the internally stratified layers of textile material with the outer envelope of the device in FIG. 1.

In FIG. 1, an absorbent device 1 in accordance with the present invention is shown in a pillow-shaped configuration formed by an envelope 2 with seaming of the four sides 2a, 2b, 2c, and 2d. This seam is shown in greater detail in FIG. 3. A longitudinal seam 20 is shown sewn along the center axis of the pillow, and lateral seams 21, 22, 23, 24, 25, 26, and 27 are shown sewn at evenly spaced intervals from one side of the pillow to the opposite side of the pillow and crossing the longitudinal seam along the center axis seam of the pillow in a perpendicular orientation. These seams are shown in greater detail in FIG. 4. Grommets 28 and 29 are placed on the longitudinal seam along the center axis seam of the pillow on each end of the pillow, providing an attachment point to allow the user to tether the device in place or serve as a connecting point with other pillows to form a continuous boom. FIG. 2 is an exploded illustration of the first embodiment of the device in FIG. 1, showing alternating layers of textile material 4 and 6 and solidifying polymer 3, 5, and 7 in a stratified arrangement between the layer of textile material 2 and the layer of impermeable material 2x comprising the outer envelope of the device.

Figure 5:
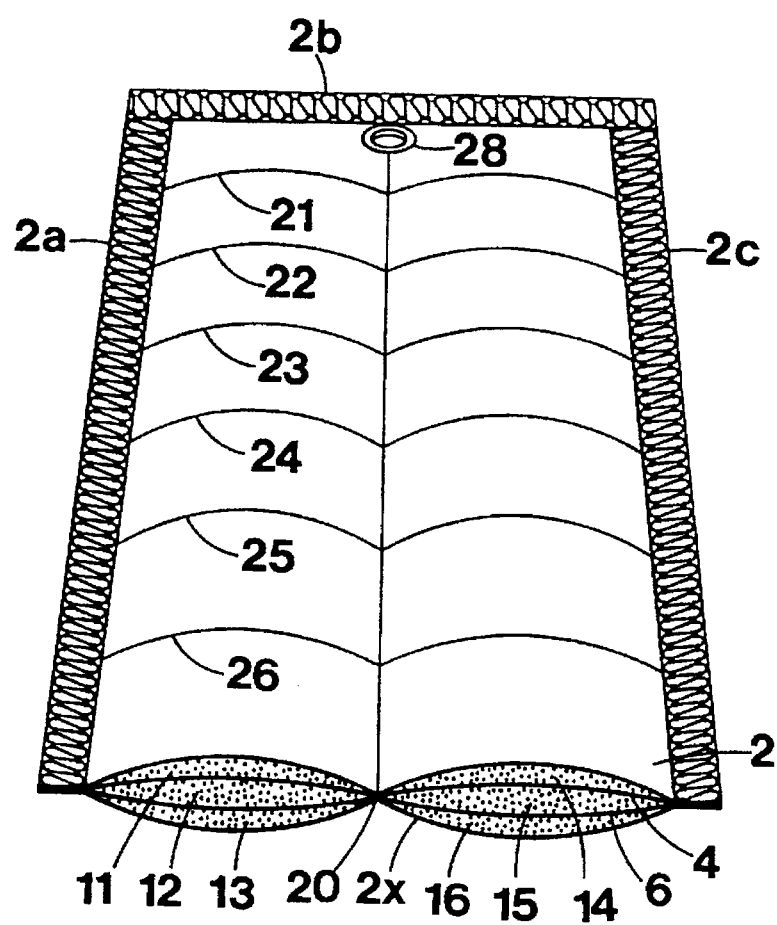
FIG. 5 shows a cross section of the first embodiment of the device in FIG. 1, indicating the chambers filled with polymer separated by the textile material and the consolidation of the outer envelope with the internal layers of textile material at the edges and at the seam along the center axis of the pillow.

Referring to FIG. 5, the cross section of the first embodiment of the pillow prior to closure at seam 2d reveals the stratification design of the pillow achieved by stacking pieces of textile material 2, 4 and 6 and the layer of impermeable material 2x and seaming them at points 2a, 2b and 2c. The resulting pockets are arranged one on top of another and enclosed by an outer envelope of layers 2 and 2x. Next, a seam 20 may be sewn along the center axis of the pillow, providing a line of additional consolidating points of the internally stratified layers of textile material with the outer envelope of the pillow along its longitudinal axis and creating two columns of pockets 11, 12, and 13 and 14, 15, and 16 within the device. FIG. 5 shows the effect of alternate multi-layering of textile material layers 2, 4, 6 and 2x and the consolidation of the layers along seams 2a, 2b, 2c and 20 to form pockets 11, 12, 13, 14, 15, and 16. These pockets are then filled with polymer and sealed into the body of the pillow, resulting in an arrangement of stratified polymer-filled chambers.

The polymer may be inserted into the device by placing a measured amount of the polymer in each pocket at the open end of the device and allowing the polymer to drop through the pockets until it is contained by seam 2b. The polymer may then be sealed in the pockets with lateral seam 21, sewn from seam 2a to seam 2c and crossing seam 20 at a perpendicular angle. Seam 21 seals the polymer into chambers and creates an additional line of consolidation points of the layers of textile material. The sealing of the polymer into chambers results in an even distribution of the polymer throughout the device as it prevents loose polymer from migrating throughout the body of the device and clustering in a few areas.

The filling process may be repeated, allowing the polymer to drop through the pockets until it is contained by seam 21 with seam 22 sewn to form the next section of stratified polymer-filled chambers. The process may be repeated until the last section of pockets is filled with polymer. The last section of polymer-filled chambers and the pillow is seamed shut by seam 2d.

The internally stratified layers of textile material are consolidated with the outer envelope of the pillow at the seams 2a, 2b, 2c and 2d around the perimeter of the pillow, and at seams 20, 21, 22, 23, 24, 25, 26, and 27 along the longitudinal and lateral axes of the device. This allows liquid hydrocarbons that come in contact with the outer envelope layers 2 and 2x to migrate via the seams 2a, 2b, 2c, 2d, 20, 21, 22, 23, 24, 25, 26, and 27 under capillary attraction to the interior layers of textile material 4 and 6 and propagate throughout the pillow.

In accordance with the first embodiment directed to containment sumps and the like, the pillow envelope 2 measures 48"×6"×¼". Each pillow chamber contains approximately 12 grams by weight of the solidifying polymer material for an approximate total weight of 576 grams of polymer in the pillow. The textile material is preferably a petro-chemical based fabric such as polypropylene, polyester or nylon. The layer of impermeable material is preferably a sheet of a petro-chemical based material such as polyethylene or the like. The polymer material is preferably an elastomer polymer under the trademark WASTE-SET 3200, WASTE-SET 3400, NOCHAR A610, NOCHAR A650, ENVIRO BOND 403, NORSOREX APX1, H-100ENVIRONMENTAL SPILL ENCAPSULANT or an equivalent.

Figure 6:
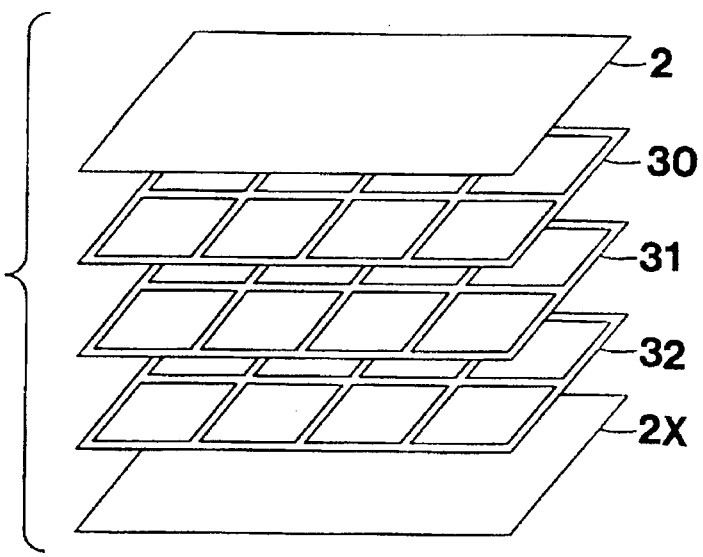
FIG. 6 is an exploded illustration of a second embodiment of the device in FIG. 1 in accordance with the present invention wherein the polymer is encased in a plurality of rectangular single-layer bags arranged to conform to the desired dimensions of the pillow and stratified to the desired thickness of the pillow with the junctions of the individual polymer-filled bags of each layer being in substantial registration with the corresponding junctions of individual polymer-filled bags of the other layers within an outer envelope.

FIG. 6 is an exploded illustration of the second embodiment of the device in FIG. 1, showing stratified layers of individual polymer-filled bags 30, 31 and 32 in a stratified arrangement between the layers 2 and 2x comprising the outer envelope of the device.

In accordance with a modification of the second embodiment, the layer of textile material 2 comprising the outer envelope of the device may be eliminated from the structure. If this form of the second embodiment is implemented, the typical density of the material for the individual polymer-filled bags may be on the order of 2.0 ounce. A suitable material for use is polypropylene or a similar synthetic fabric. Thus, with reference to FIG. 6, the modified device would include the layers of individual polymer-filled bags 30, 31 and 32 in the same stratified arrangement, but without the layer of textile material 2 forming the outer envelope. Of course, the consolidation and seaming of the stratified layers with the layer of impermeable material 2x that results in a quilting effect (see FIG. 8) remains applicable to the modified second embodiment without outer envelope layer 2.

Figure 7:
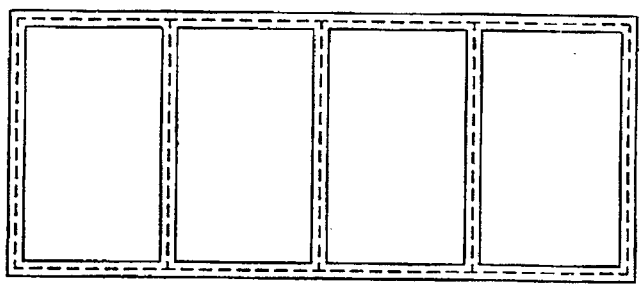
FIG. 7 shows a series of polymer-filled and sealed bags of single layer fabrication joined by an ultra-sonic seam. This method of seaming may be used to encase the polymer in each of the individual bags, to seal the stratified layers within the outer envelope along the perimeter of the pillow and to create the consolidation seams of the outer envelope with the stratified layers of the device.

Referring to FIG. 7, a series of polymer-filled and sealed bags of single layer textile material are shown joined by ultrasonic seams. This method of seaming may be used to encase the polymer in each of the individual bags, to seal the stratified layers within the outer envelope along the perimeter of the pillow and to create the consolidation seams of the outer envelope with the stratified layers of the device.

Figure 8:
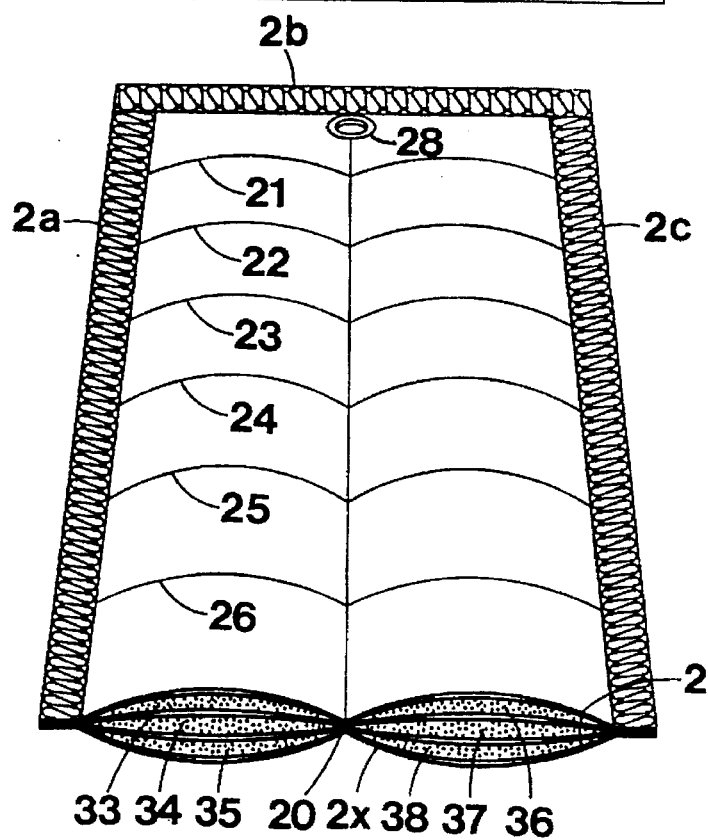
FIG. 8 shows a cross section of the second embodiment of the device in FIG. 1, indicating the stratified layers of individual polymer-filled bags encased within an outer envelope and the consolidation of the outer envelope with the outer edges and the internal junctions of the substantially registered stratified layers of individual polymer-filled bags.

Referring to FIG. 8, the cross section of the second embodiment of the device prior to closure at seam 2d reveals the stratification design of the pillow achieved by stratifying layers of individual polymer-filled bags 33, 34, 35, 36, 37 and 38 between outer envelope layers 2 and 2x. The outer edges of the internal layers of polymer-filled bags are consolidated with the outer edges of the materials forming the outer envelope of the device along seams 2a, 2b and 2c. Seam 20 is sewn along the center axis of the pillow and seams 21, 22, 23, 24, 25, and 26 are sewn laterally across the pillow to consolidate the outer envelope layers with the internal layers along the junctions of the substantially registered stratified layers of individual polymer-filled bags.

FIG. 8 shows the effect of the stratified layering of individual polymer-filled bags 33, 34, 35, 36, 37 and 38 between the outer envelope layers 2 and 2x and the consolidation of the layers along seams 2a, 2b, 2c and 20 21, 22, 23, 24, 25 and 26 to form an arrangement of polymer-filled chambers within the body of the device. The internally stratified layers of individual polymer-filled bags are consolidated with the outer envelope of the pillow at the seams 2a, 2b, 2c and 2d around the perimeter of the pillow, and at seams 20, 21, 22, 23, 24, 25, and 26 along the longitudinal and lateral axes of the device.

These seams allow liquid hydrocarbons that come in contact with the textile material outer envelope layer 2 to migrate via the seams 2a, 2b, 2c, 2d, 20, 21, 22, 23, 24, 25, 26, and 27 under capillary attraction to the interior layers of individual polymer-filled bags 33, 34, 35, 36, 37 and 38 and propagate throughout the pillow.

In accordance with the second embodiment directed to containment sumps and the like, the pillow envelope 2 measures 48"×6"×¼". Each pillow chamber contains approximately 12 grams by weight of the solidifying polymer material for an approximate total weight of 576 grams of polymer in the pillow. The textile material is preferably a petro-chemical based fabric such as polypropylene, polyester or nylon. The layer of impermeable material is preferably a sheet of a petro-chemical based material such as polyethylene or the like. The polymer material is preferably an elastomer polymer under the trademark WASTE-SET 3200, WASTE-SET 3400, NOCHAR A610, NOCHAR A650, ENVIRO-BOND 403, NORSOREX APX1, H-100 ENVIRONMENTAL SPILL ENCAPSULANT or an equivalent.

Figure 9:
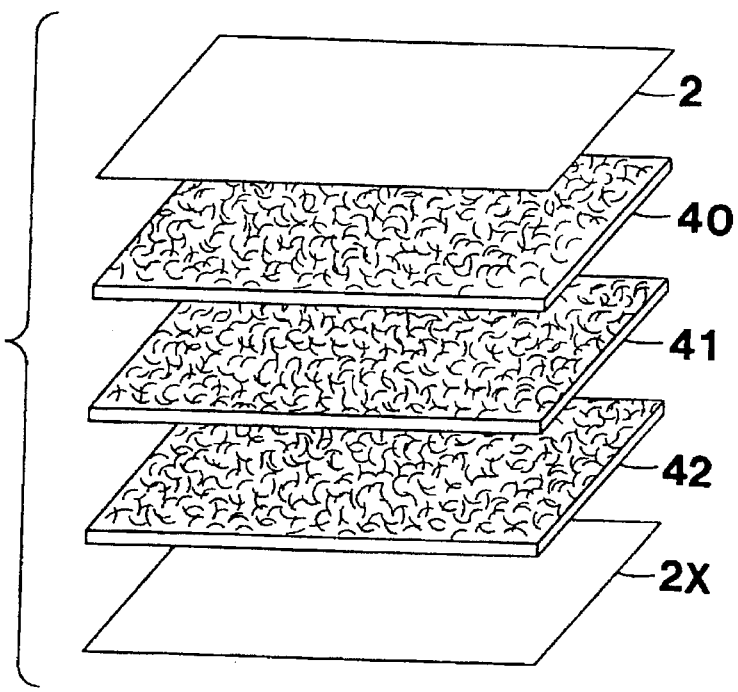
FIG. 9 is an exploded illustration a third embodiment of the device in FIG. 1 in accordance with the present invention wherein layers of textile material, with an evenly distributed, measured amount of polymer suspended within the web of filaments of the textile material, are arranged and stratified to conform to the desired dimensions of the device within an outer envelope.

FIG. 9 is an exploded illustration of the third embodiment of the device in FIG. 1, showing layers of solidifying polymer suspended in textile material 40, 41 and 42 in a stratified arrangement between layers 2 and 2x comprising the outer envelope of the device.

In accordance with a modification of the third embodiment, the layer of textile material 2 comprising the outer envelope of the device may be eliminated from the structure. If this form of the third embodiment is implemented, the typical density of any single layer of polymer suspended in textile material may be on the order of 2.0 ounce. A suitable material for use is polypropylene or a similar synthetic fabric. Thus, with reference to FIG. 9, the modified device would include the layers of polymer suspended in textile material 43, 44 and 45 in the same stratified arrangement, but without the layer of textile material 2 forming the outer envelope. Of course, the consolidation and seaming of the stratified layers with the layer of impermeable material 2x that results in a quilting effect (see FIG. 10) remains applicable to the modified third embodiment without outer envelope layer 2.

Figure 10:
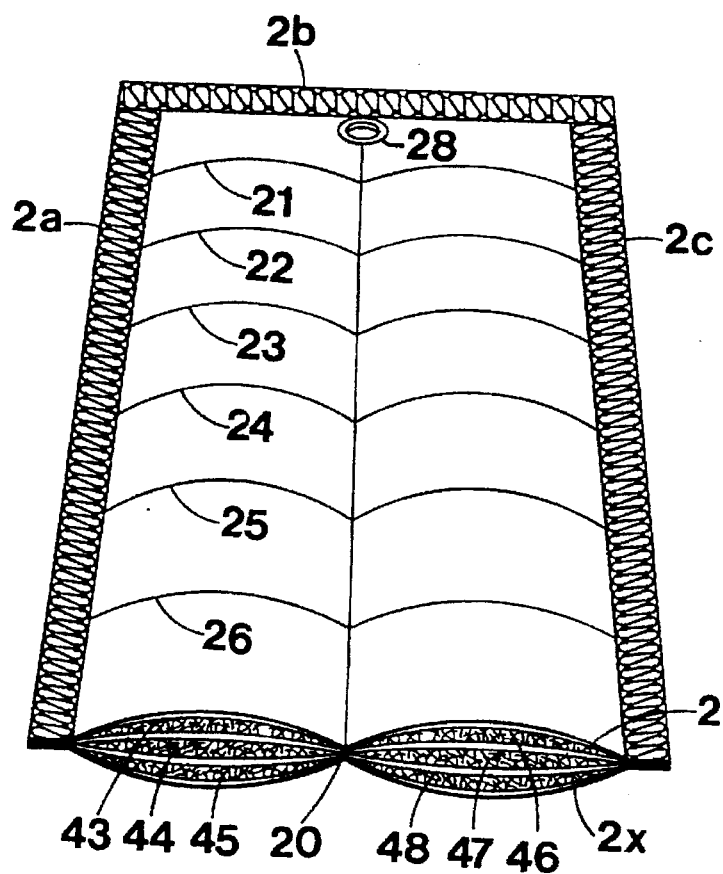
FIG. 10 shows a cross section of the third embodiment of the device in FIG. 1, indicating the layers of textile material, with an evenly distributed, measured amount of polymer suspended within the web of filaments of the textile material, arranged in stratification within an outer envelope with the internally stratified layers of textile material and suspended polymer and the outer envelope consolidated by seaming at the edges and along the center axis of the device.

Referring to FIG. 10, the cross section of the third embodiment of the device prior to closure at seam 2d reveals the stratification design of the pillow achieved by stratifying layers of polymer suspended in textile material 43, 44 and 45 between outer envelope layers 2 and 2x and seaming them at points 2a, 2b and 2c using the seam illustrated in FIG. 3. Seam 20 may be sewn along the center axis of the pillow, providing a line of additional consolidating points of the internally stratified layers of polymer suspended in textile material with the outer envelope of the pillow along its longitudinal axis and creating two columns of internally stratified layers of polymer suspended in textile material 43, 44 and 45, and 46, 47 and 48 within the device. FIG. 10 shows the effect of the stratified layering of polymer suspended in textile material 43, 44 and 45, and 46, and 48 between the outer envelope layers 2 and 2x and the consolidation of the layers along seams 2a, 2b, 2c and 20, 21, 22, 23, 24, 25 and 26 to form an arrangement of polymer-filled chambers within the body of the device.

These seams allow liquid hydrocarbons that come in contact with the outer envelope layer 2 to migrate via the seams 2a, 2b, 2c, 2d, 20, 21, 22, 23, 24, 25, 26, and 27 under capillary attraction to the interior stratified layers of polymer suspended in textile material 43, 44 and 45, and 46, 47 and 48 and propagate throughout the pillow.

In accordance with the third embodiment directed to containment sumps and the like, the pillow envelope 2 measures 48"×6"×¼". Each layer of polymer suspended in textile material contains approximately 192 grams by weight of the solidifying polymer material for an approximate total weight of 576 grams of polymer in the pillow. The textile material is preferably a petro-chemical based fabric such as polypropylene, polyester or nylon. The layer of impermeable material is preferably a sheet of a petro-chemical based material such as polyethylene or the like. The polymer material is preferably an elastomer polymer under the trademark WASTE-SET 3200, WASTE-SET 3400, NOCHAR A610, NOCHAR A650, ENVIRO-BOND 403, NORSOREX APX1, H-100 ENVIRONMENTAL SPILL ENCAPSULANT or an equivalent.

Ambient temperature and the viscosity of the liquid hydrocarbon to be solidified are the two most critical factors in determining the rate of absorption and the amount of time required to solidify the broad spectrum of liquid hydrocarbons this invention is designed to contain for removal and disposal. To enhance the polymer's effective interaction with pollutants, the pillow's construction utilizes the layering of polymer material and textile material to control the rate of absorption and solidification.

The properties of the textile material that allow for rapid absorption and migration of all viscosities of liquid hydrocarbons effectively give the device maximum surface area exposure of the polymer through the most basic stratification design of the outer envelope with the internally stratified layers.

The effectiveness of the pillow may be enhanced with the addition of quilting seams. A longitudinal seam 20 along the center axis of the pillow and lateral seams 21, 22, 23, 24, 25, 26 and 27 perpendicular to the center axis of the pillow provide consolidation points of the internally stratified layers of textile material with the external textile material envelope and forms chambers within the pillow. The consolidation of the internal layers of textile material within the outer envelope speeds migration of the liquid hydrocarbons throughout the interior stratified layers of the pillow via the capillary attraction of the liquid hydrocarbons to the textile material. The lateral seams may also be oriented at an oblique angle to the center axis of the pillow. In either case, a quilted effect is achieved. Also, a plurality of seams may be placed parallel to the longitudinal center axis instead of a single seam located on the longitudinal center axis. Further, a similar quilting effect may be achieved by placing a plurality of seams that cross the pillow at oblique angles to one another so as to form the pockets in diamond, rather than square or rectangular, shapes. Other quilting designs may also be used.

The stratification design allows for optimum efficiency in utilizing the solidifying properties of the polymer. Very light viscosity liquid hydrocarbons react almost instantaneously with the polymer and are exposed to no more polymer than can be fully utilized for absorption and solidification. Stratification promotes rapid migration of light viscosity liquid hydrocarbons throughout the interior of the pillow while slowing migration of the liquid hydrocarbon through the outer surface envelope area and exposure to the polymer. The extremely rapid reaction between the light viscosity liquid hydrocarbon and the polymer could otherwise result in the loose polymer located within the volume of the pillow being surrounded by a non-permeable rubber shell. The resulting surface blockage would thereby prevent the enclosed polymer from being used to solidify additional liquid hydrocarbons.

In addition, the stratification design allows the heavier viscosity liquid hydrocarbons that migrate through the layers of textile material to be suspended inside the pillow awaiting the polymer to absorb them and begin the solidification process.

A combination of the embodiments may be desirable to further enhance the effectiveness of the pillow. For instance, the placement of a layer of solidifying polymer 7 (see FIG. 2) from the first embodiment of the device between the layer of impermeable material 2x and the adjacent stratified layer of polymer suspended in textile material 42 (see FIG. 9) of the third embodiment of the device may serve to increase the total liquid hydrocarbon uptake and retention capacity of the pillow. Solidifying polymer layer 7 (see FIG. 2) from the first embodiment of the device may similarly be placed between the layer of impermeable material 2x and the adjacent stratified layer of individual polymer-filled bags 32 (see FIG. 6) of the second embodiment.

Devices of this type may be used to collect and contain spills and leaks from the containment sumps, generally found beneath equipment and machinery using liquid hydrocarbons for fuel and lubrication, for removal and disposal. The devices may further be utilized in a wide variety of applications including, but are not limited to, removal of liquid hydrocarbons from beneath motorized vehicles, electricity transformers, petrochemical pipelines, printing presses, aircraft, railroad equipment and fuel and lubricant containers.

The foregoing description of the preferred embodiment has been for the purpose of explanation and illustration. It will be appreciated by those skilled in the art that many modifications and changes may be made in the structure without departing from the essence of the present invention. For example, certain types of treated paper products may be substituted for the textile material or the layer of impermeable material. Therefore, it is contemplated that the appended claims will cover any modifications or embodiments which fall within the scope of the invention.

What is claimed is:

1. A liquid hydrocarbon absorbent device comprising:

a pillow having a plurality of stacked fabric layers dispersively conducting liquid hydrocarbons under capillary attraction substantially throughout the pillow, each fabric layer comprising a plurality of pockets formed by a pattern of fused interconnections between first and second layers of textile material such that the plurality of stacked fabric layers forms a plurality of pockets in stratification within the pillow;

a polymer material contained within the pillow to absorb and solidify liquid hydrocarbon substances, said polymer material being suspended within said pockets; and a seam joinder of the peripheries of the layers to promote migration of liquid hydrocarbons under capillary attraction to the pockets.

2. The device of claim 1 further comprising an outer envelope surrounding the stacked fabric layers.

3. The device of claim 2 wherein the outer envelope comprises first and second layers of textile material that sandwich the stacked fabric layers.

4. The device of claim 2 wherein the outer envelope comprises an outer facing layer of an impermeable material extending over a surface of the pillow and acting to retain liquids within the pillow.

5. The device of claim 2 wherein the seam joinder of the outer envelope and the stacked fabric layers promotes migration of liquid hydrocarbons under capillary attraction to the pockets.

6. The device of claim 1 wherein the polymer material is an elastomer polymer.

7. A liquid hydrocarbon absorbent device comprising:

a pillow having a plurality of stacked fabric layers dispersively conducting liquid hydrocarbons under capillary attraction substantially throughout the pillow, each fabric layer comprising a plurality of pockets formed by a pattern of fused interconnections between first and second layers of textile material such that the plurality of stacked fabric layers forms a plurality of pockets in stratification within the pillow;

a polymer material contained within the pillow to absorb and solidify liquid hydrocarbon substances, said polymer material being suspended within said pockets;

a series of seams formed in the pillow providing consolidation points of the internally stratified pockets so as to promote dispersion of liquid hydrocarbons throughout the interior of the pillow to the polymer material; and a seam joinder of the peripheries of the layers to promote migration of liquid hydrocarbons under capillary attraction to the pockets.

8. The device of claim 7 further comprising an outer envelope surrounding the stacked fabric layers.

9. The device of claim 8 wherein the outer envelope comprises first and second layers of textile material that sandwich the stacked fabric layers.

10. The device of claim 8 wherein the outer envelope comprises an outer facing layer of an impermeable material extending over a surface of the pillow and acting to retain liquids within the pillow.

11. The device of claim 8 wherein the seam joinder of the outer envelope and the stacked fabric layers promotes migration of liquid hydrocarbons under capillary attraction to the pockets.

12. The device of claim 8 wherein the series of seams formed in the pillow provides consolidation points of the outer envelope and the stacked fabric layers to promote migration of liquid hydrocarbons under capillary attraction to the pockets.

13. The device of claim 7 wherein the polymer material is an elastomer polymer.

\* \* \* \* \*